O. Tenny.
Hydraulic Propeller.
N° 80,239.   Patented Jul. 21, 1868.

Witnesses:
Jacob F. Tenny
Louis Orothas

Inventor
Oliver Tenny
By Wiedersheim & Co
Attorneys

United States Patent Office.

OLIVER TENNY, OF LITTLETON, MASSACHUSETTS.

Letters Patent No. 80,239, dated July 21, 1868.

IMPROVEMENT IN PROPELLING VESSELS.

The Schedule referred to in these Letters Patent and making part of the same.

TO ALL WHOM IT MAY CONCERN:

Be it known that I, OLIVER TENNY, of Littleton, in the county of Middlesex, and State of Massachusetts, have invented a new and useful Mode of Propelling Vessels; and I do hereby declare the following to be a full, clear, and exact description of the same, sufficient to enable others skilled in the art to which my invention appertains to fully understand and use the same, reference being had to the accompanying drawings, which are made a part of this specification, and in which—

Figure 1 may represent a plan of a portion of a vessel with my propelling-apparatus applied.

Figure 2 is a longitudinal section of the same, the plane of section being through one of the cylinders hereinafter referred to.

Similar letters of reference indicate corresponding parts in the several figures.

Figure 1:
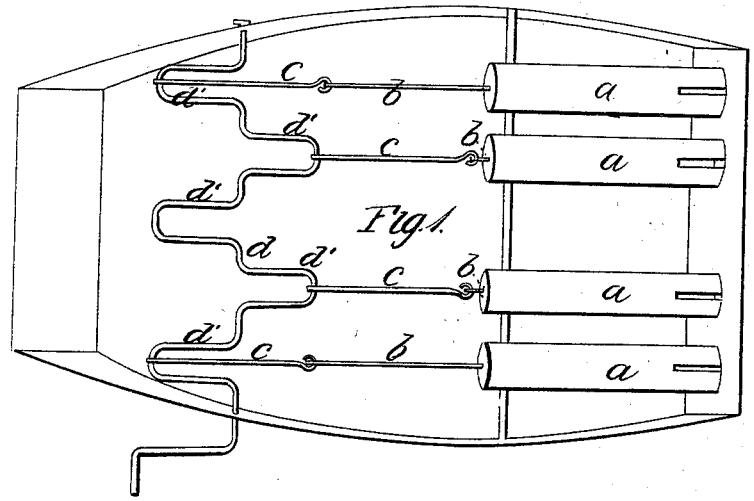

The object of this invention is to provide a novel and simple apparatus whereby vessels may be propelled in a most effective and economical manner.

In the drawings—

$a\,a\,a\,a$ may represent a series of cylinders, suitably mounted, in parallel positions, in the stern of the vessel, and below the water-line. The outer ends of these cylinders are open to the water, whose natural tendency is to flow into the same. The inner ends of the cylinders $a$ may be closed so as to afford guides for the rods $b$ to the shaft $d$, which has cranks $d'$ for the attachment of the rods $c$, and of the rod which may be employed to impart a rotary motion to said shaft, the same being driven by an engine or otherwise.

The rotary motion of the shaft $d$ gives a reciprocating motion to the rods $b$, and to the heads or followers $e$, which are fitted therein. No vacuum is created within the cylinders $a$ when the heads $e$ are drawn inwards, said heads being fitted loosely or provided with apertures to admit of the free passage of the air from side to side. The effect of this is to relieve the driving-machinery of as much resistance as would be involved in reciprocating the heads or followers $e$, if the latter were made to act as sucking-plungers.

$f\,f$ are disks or pistons, fitted within the cylinders $a\,a$, one for each, and working between the heads $e$ and the open ends of said cylinders. The disks $f$ are confined within the cylinders by the stop-rods $g$, and said disks are free to move back and forth within the cylinders, yet they are fitted sufficiently tight to prevent the water from reaching the heads or followers $e$.

Figure 2:
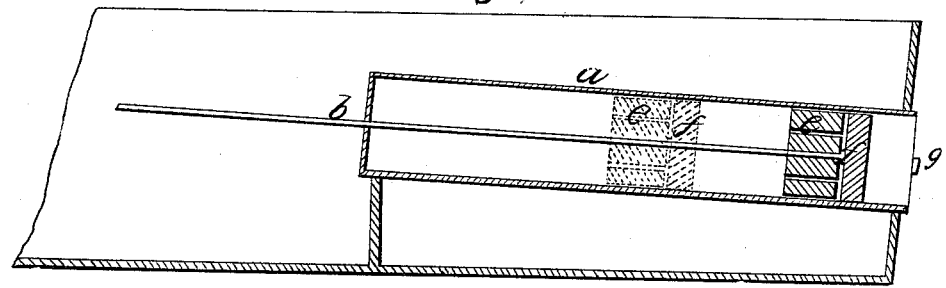
Figure 3:
Figures 3 and 4 are longitudinal sections of said cylinders.
Figure 4:
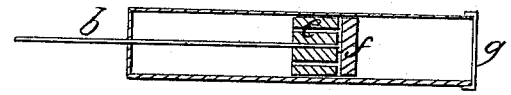

By referring to fig. 2, the operation will be readily understood. It will be observed that when the heads $e$ have been drawn inward, the water entering the cylinders causes the corresponding disks $f$ to recede in the direction of the heads $e$. The rods $b$, together with the heads $e$, being then moved outward, the disks $f$ are impelled against the water, which, in being ejected from the cylinders, reacts and propels the vessel.

Having thus described my invention, what I claim as new, and desire to secure by Letters Patent, is—

The combination, with the cylinders $a$, of the heads or followers $e$ and disks or pistons $f$, all arranged and operating substantially as described.

The above specification of my improvement in mode of propelling vessels, signed this day, the 12th of February, 1868.

OLIVER TENNY.

Witnesses:
  JACOB HENRY,
  LOUIS BRODHAG.